United States Patent
Choi et al.

(10) Patent No.: US 10,152,086 B2
(45) Date of Patent: Dec. 11, 2018

(54) FOLDABLE DISPLAY APPARATUS

(71) Applicant: Samsung Display Co., Ltd., Yongin-si, Gyeonggi-do (KR)

(72) Inventors: Kyungmin Choi, Seoul (KR); Younjoon Kim, Seoul (KR); Jangdoo Lee, Suwon-si (KR); Junghun Lee, Hwaseong-si (KR); Mi Jang, Suwon-si (KR); Taehyeog Jung, Hwasong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/076,589

(22) Filed: Mar. 21, 2016

(65) Prior Publication Data

US 2016/0366772 A1 Dec. 15, 2016

(30) Foreign Application Priority Data

Jun. 15, 2015 (KR) ........................ 10-2015-0084247

(51) Int. Cl.
*G06F 1/16* (2006.01)
*G09F 9/30* (2006.01)

(52) U.S. Cl.
CPC .......... *G06F 1/1652* (2013.01); *G06F 1/1616* (2013.01); *G06F 1/1675* (2013.01); *G09F 9/301* (2013.01)

(58) Field of Classification Search
CPC .... G06F 1/1652; G06F 1/1616; G06F 1/1641; G06F 1/1624; G06F 1/1615;
(Continued)

(56) References Cited

U.S. PATENT DOCUMENTS

| | | | |
|---|---|---|---|
| 8,873,225 B2 * | 10/2014 | Huitema | G06F 1/1615 345/168 |
| 2008/0151480 A1 * | 6/2008 | Chung | G06F 1/1615 361/679.06 |

(Continued)

FOREIGN PATENT DOCUMENTS

| | | |
|---|---|---|
| JP | 2014-174521 A | 9/2014 |
| KR | 10-1186969 B1 | 9/2007 |

(Continued)

OTHER PUBLICATIONS

Abstract for KR 10-2007-0092597 A which corresponds with KR 10-1186969 B1, dated Sep. 13, 2007, 1 page.

(Continued)

*Primary Examiner* — James Wu
(74) *Attorney, Agent, or Firm* — Lewis Roca Rothgerber Christie LLP

(57) ABSTRACT

A display apparatus includes: a flexible display module including a first display part, a second display part, and a third display part; a supporting member coupled to the first display part and including a hinge, a first supporting part, and a second supporting part; a first housing configured to have the first supporting part inserted and withdrawn; a second housing configured to have the second supporting part inserted and withdrawn; a first guide member coupled to the first housing and configured to guide the second display part when the first supporting part is inserted into or withdrawn from the first housing; and a second guide member coupled to the second housing and configured to guide the third display part when the second supporting part is inserted into or withdrawn from the second housing.

16 Claims, 16 Drawing Sheets

(58) Field of Classification Search
CPC .... G06F 1/1647; H04M 1/0268; G09F 9/301; H05K 5/0017; H05K 1/028; H05K 5/0226
See application file for complete search history.

(56) References Cited

U.S. PATENT DOCUMENTS

| | | | |
|---|---|---|---|
| 2013/0010405 A1* | 1/2013 | Rothkopf | H04M 1/0216 361/679.01 |
| 2013/0058063 A1* | 3/2013 | O'Brien | G06F 1/1624 361/807 |
| 2014/0320393 A1 | 10/2014 | Modarres et al. | |
| 2016/0070303 A1* | 3/2016 | Lee | G06F 1/1616 361/679.27 |
| 2016/0216737 A1* | 7/2016 | Hayk | G06F 1/1652 |

FOREIGN PATENT DOCUMENTS

| | | |
|---|---|---|
| KR | 10-0818170 B1 | 4/2008 |
| KR | 10-1301918 B1 | 10/2008 |
| KR | 10-1176271 B1 | 2/2010 |
| KR | 10-1063109 B1 | 6/2010 |
| KR | 10-2011-0028893 A | 3/2011 |
| KR | 10-2013-0028453 A | 3/2013 |
| KR | 10-2013-0055263 A | 5/2013 |
| KR | 10-2014-0059274 A | 5/2014 |
| KR | 10-2014-0101124 A | 8/2014 |
| KR | 10-2014-0121649 A | 10/2014 |

OTHER PUBLICATIONS

Abstract for KR 10-2010-0012044 A which corresponds with KR 10-1176271 B1, dated Feb. 4, 2010, 1 page.
Abstract for KR 10-2010-0069162 A which corresponds with KR 10-1063109 B1, dated Jun. 24, 2010, 1 page.
Abstract for KR 10-2008-0091145 A which corresponds with KR 10-1301918 B1, dated Aug. 30, 2013, 1 page.

* cited by examiner

FOLDABLE DISPLAY APPARATUS

CROSS-REFERENCE TO RELATED APPLICATION

This U.S. non-provisional patent application claims priority to and the benefit of Korean Patent Application No. 10-2015-0084247, filed on Jun. 15, 2015, the entire content of which is hereby incorporated by reference.

BACKGROUND

1. Field

Aspects of embodiments of the present invention relate to a display apparatus.

2. Description of the Related Art

A display module displays various images on a display screen to provide information to a user. In general, a display module displays information within an allocated screen. Flexible display modules including curved flexible display panels are currently being developed. Flexible display apparatuses may be folded, rolled, or bent like a paper, unlike flat display apparatuses. Flexible display apparatuses capable of being diversely varied in shape may be portable, while not being restricted to conventional screen sizes to enhance user convenience.

The above information disclosed in this Background section is only to enhance the understanding of the background of the disclosure, and therefore it may contain information that does not constitute prior art.

SUMMARY

Aspects of embodiments of the present invention relate to a flexible display apparatus, and a display apparatus including a flexible display module capable of folding and sliding.

According to some example embodiments of the present invention, a display apparatus may be capable of folding and sliding in both directions.

According to some example embodiments of the present invention, a display apparatus may be capable of folding and sliding in one direction.

According to some example embodiments of the present invention, a display apparatus includes: a flexible display module comprising a first display part, a second display part, and a third display part; a supporting member coupled to the first display part and comprising a hinge, a first supporting part, and a second supporting part; a first housing configured to have the first supporting part inserted and withdrawn; a second housing configured to have the second supporting part inserted and withdrawn; a first guide member coupled to the first housing and configured to guide the second display part when the first supporting part is inserted into or withdrawn from the first housing; and a second guide member coupled to the second housing and configured to guide the third display part when the second supporting part is inserted into or withdrawn from the second housing.

According to some embodiments, the flexible display module is foldable relative to the hinge.

According to some embodiments, the first housing and the second housing are configured to be coupled to each other in a first operation mode, and the first housing and the second housing are configured to be separated from each other in a second operation mode.

According to some embodiments, the first display part is configured to be exposed to the outside in the first operation mode and the second operation mode, the second display part is configured to be accommodated in the first housing in the first operation mode and is configured to be exposed to the outside from the first housing in the second operation mode, and the third display part is configured to be accommodated in the second housing in the first operation mode and is configured to be exposed to the outside from the second housing in the second operation mode.

According to some embodiments, the first guide member is configured to bend the second display part that is inserted into the first housing to face the first display part, and the second guide member is configured to bend the third display part that is inserted into the second housing to face the first display part.

According to some embodiments, the first guide member is configured to roll the second display part inserted into the first housing to be wound around the first guide member, and the second guide member is configured to roll the third display part inserted into the second housing to be wound around the second guide member.

According to some embodiments, each of the first housing and the second housing comprise an auxiliary supporting member below the supporting member in the first operation mode and below the second display part or the third display part in the second operation mode.

According to some embodiments, at least one of the first guide member and the second guide member is a rotational body.

According to some embodiments, the display apparatus further includes a first lower protection member below the first display part and comprising metal; and a second lower protection member below the second display part and the third display part and comprising a plastic film.

According to some embodiments, the supporting member further includes a heat radiation plate and a battery.

According to some embodiments, a display surface of the first display part is divided into a first part and a second part on a plane with respect to the hinge, and the first part and the second part are configured to be in-folded to face each other.

According to some embodiments, a display surface of the first display part is divided into a first part and a second part on a plane with respect to the hinge, and the first part and the second part are out-folded to face the outside.

According to some embodiments, the first display part has an area in a range of 0.8 times to 1.2 times the sum of areas of the second and third display parts.

According to some embodiments of the present invention, a display apparatus includes: a flexible display module comprising a first display part and a second display part; a supporting member coupled to the first display part and comprising a hinge and a supporting part; a first housing coupled to a first side portion of the flexible display module and configured to have the supporting part inserted and withdrawn; a second housing coupled to a second side portion of the flexible display module; and a guide member coupled to the first housing and guiding the second display part when the supporting part is inserted into or withdrawn from the first housing.

According to some embodiments, the flexible display module is foldable relative to the hinge.

According to some embodiments, the first housing and the second housing are configured to be coupled to each other in a first operation mode, and the first housing and the second housing are configured to be separated from each other in a second operation mode.

According to some embodiments, the first display part is configured to be exposed to the outside in the first operation mode and the second operation mode, and the second display part is configured to be accommodated in the first housing in the first operation mode and is configured to be exposed to the outside from the first housing in the second operation mode.

According to some embodiments, the guide member is configured to bend the second display part that is inserted into the first housing to face the first display part.

According to some embodiments, the guide member is configured to roll the second display part that is inserted into the first housing to be wound around the first guide member.

According to some embodiments, the first housing comprises an auxiliary supporting member below the supporting member in the first operation mode and below the second display part in the second operation mode.

DETAILED DESCRIPTION

The aspects, features, and characteristics of some example embodiments of the present invention will be better understood in conjunction with the accompanying drawings. The present invention may, however, be embodied in different forms and should not be construed as limited to the embodiments set forth herein. Rather, these embodiments are provided so that this disclosure will be more thorough and more complete, and will more fully convey the scope of the present invention to those skilled in the art.

Figure 1:
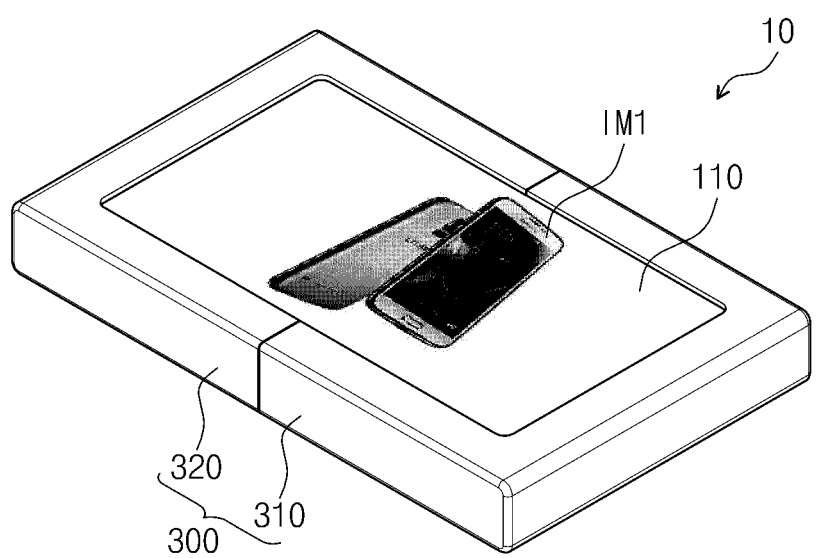
FIGS. 1 to 3B are perspective views of operating states of a display apparatus according to some example embodiments of the present invention.
Figure 2:
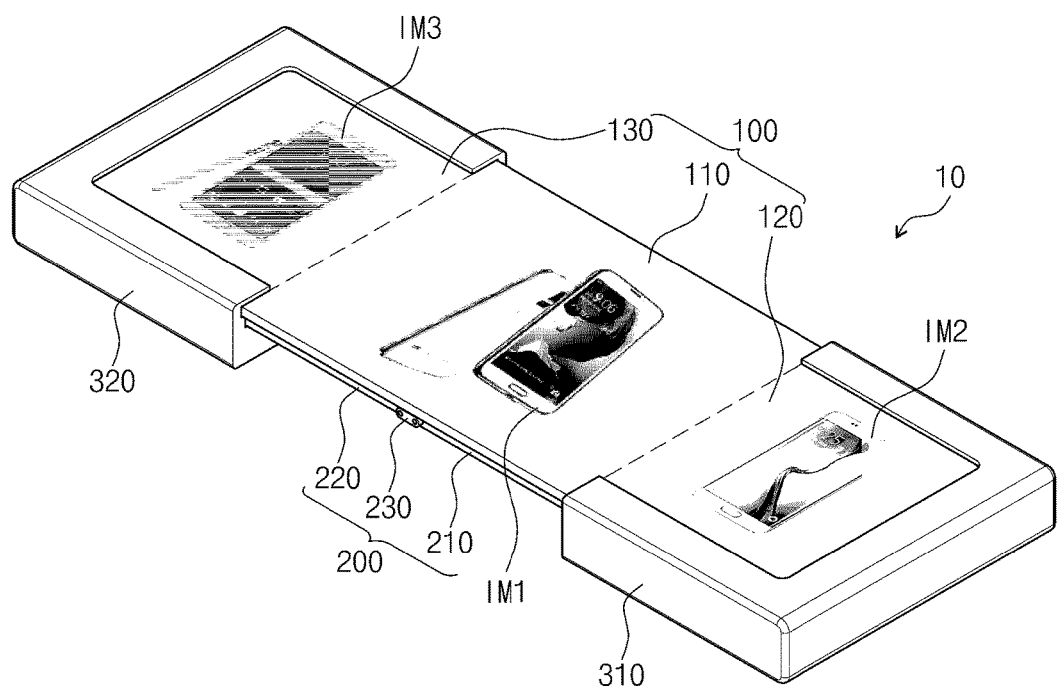
Figure 3A:
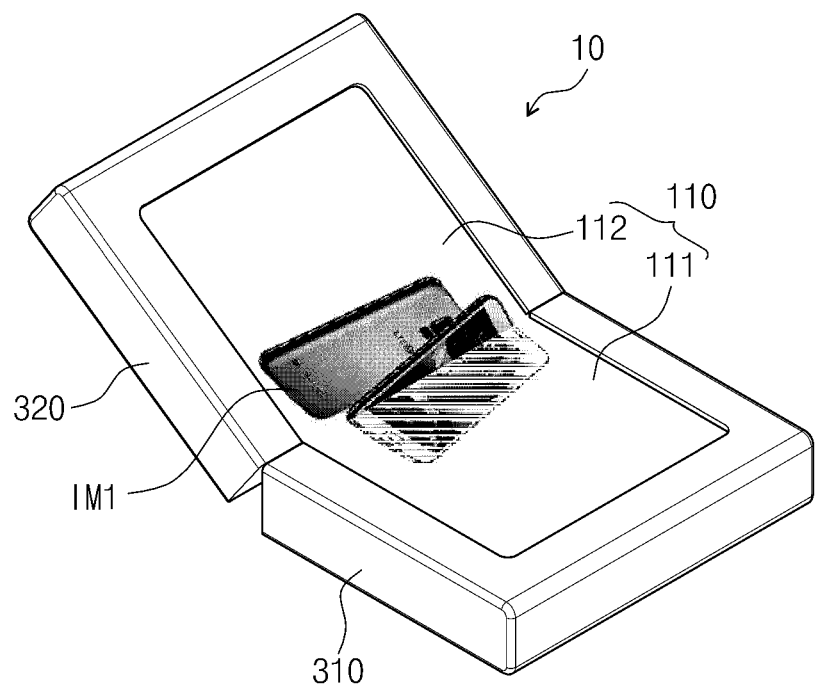
Figure 3B:
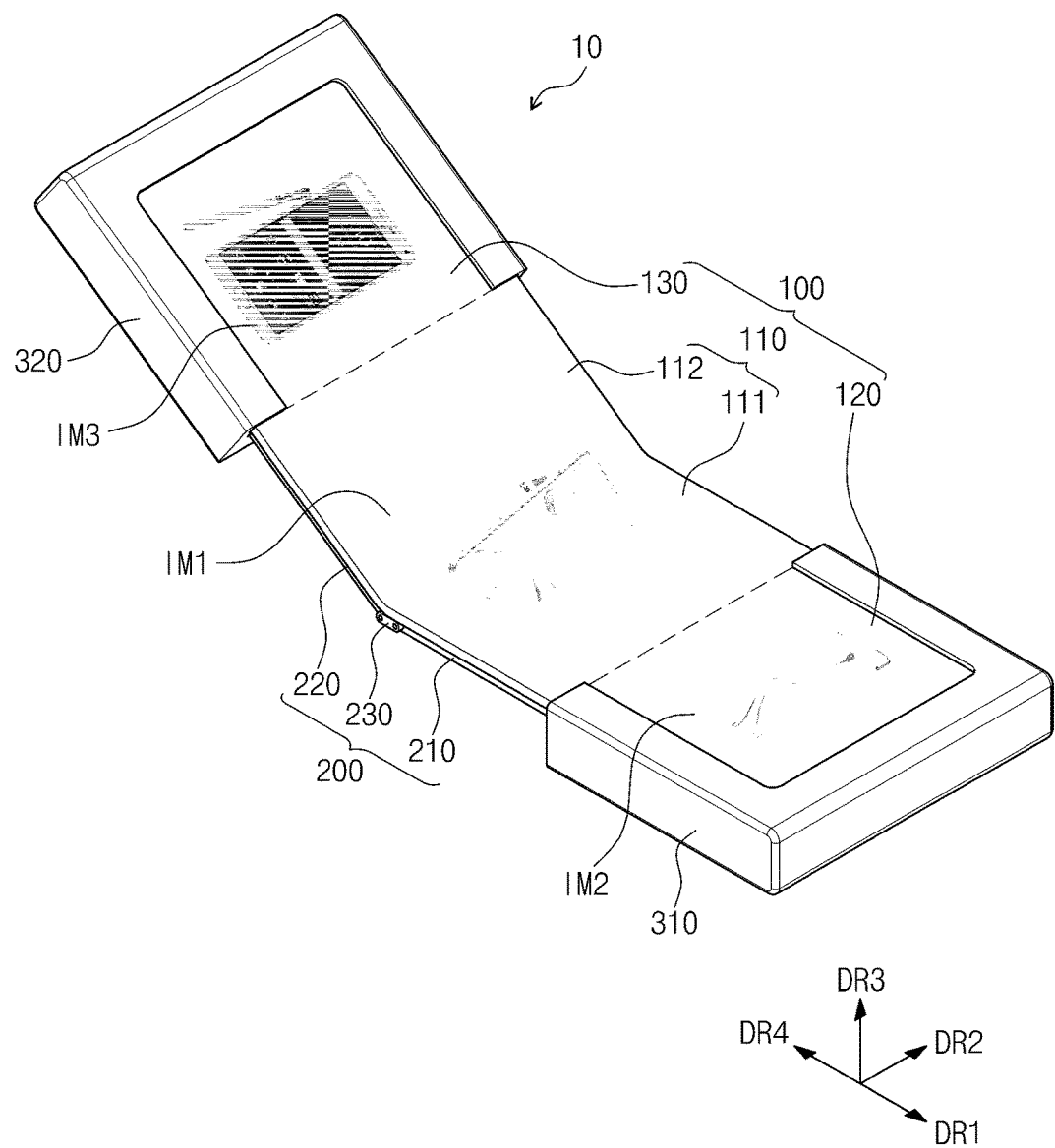

FIGS. 1 to 3B are perspective views of a display apparatus according to some example embodiments of the present invention. FIG. 1 illustrates a display apparatus 10 in a closed mode (hereinafter, referred to as a "first operation mode"). FIG. 2 illustrates the display apparatus 10 in an opened mode (hereinafter, referred to as a "second operation mode"). FIG. 3A illustrates the display apparatus 10 folding in the first operation mode. FIG. 3B illustrates the display apparatus 10 folding in the second operation mode.

Figure 7A:
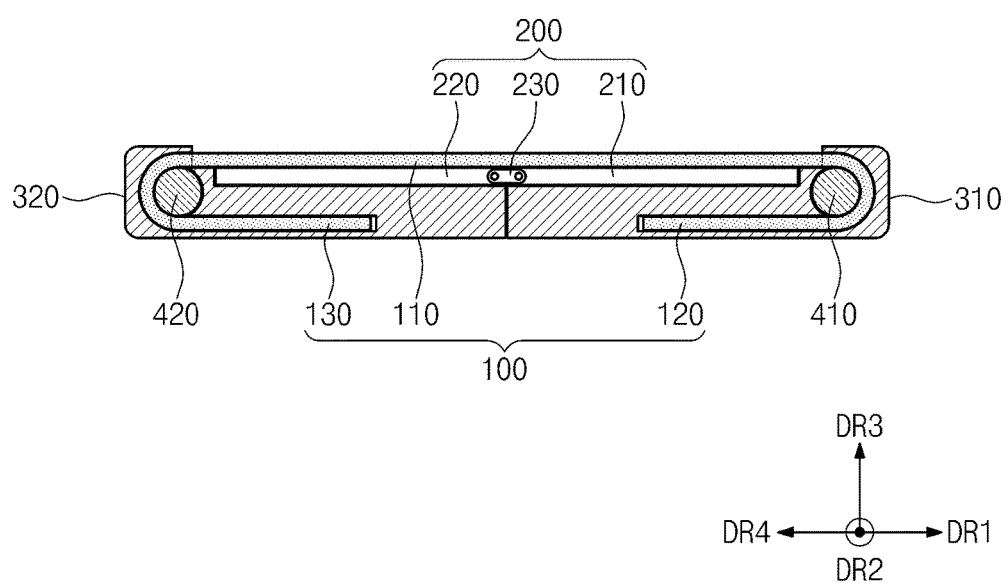
FIGS. 7A to 9 are cross-sectional views of a display apparatus according to some example embodiments of the present invention.

As illustrated in FIGS. 1 and 2, the display apparatus 10 includes a flexible display module 100, a supporting member 200, housings 300, and guide members (see reference numeral 400 in FIG. 7A). The flexible display module 100 includes a first display part 110, a second display part 120, and a third display part 130.

The flexible display module 100 may be folded and rolled. The flexible display module 100 may include an organic light emitting device. Although the flexible display module 100 may include a touch screen panel, the components included in the flexible display module 100 are not limited thereto.

The supporting member 200 includes a first supporting part 210, a second supporting part 220, and a hinge 230. Housings 300 include a first housing 310 and a second housing 320. The guide members (see reference numeral 400 in FIG. 7A) include a first guide member (see reference numeral 410 in FIG. 7A) and a second guide member (see reference numeral 420 in FIG. 7A).

The display apparatus 10 in the first operation mode will be described with reference to FIG. 1. The first housing 310 and the second housing 320 are coupled to each other. The first display part 110 may be exposed to the outside and provide (e.g., display) first image information IM1 to a user. The second display part 120 and the third display part 130 are accommodated (e.g., positioned) in the first housing 310 and the second housing 320, respectively.

The display apparatus 10 in the second operation mode will be described with reference to FIG. 2. The first housing 310 and the second housing 320 are separated (e.g., moved in opposite directions away) from each other. The first housing 310 may move in a first direction DR1, and the second housing 320 may move in a fourth direction DR4. As the first housing 310 and the second housing 320 are separated from each other, the second display part 120 and the third display part 130 are externally exposed from the first housing 310 and the second housing 320, respectively. In the second operation mode, the first to third display parts 110, 120, and 130 are exposed to the outside to respectively provide (e.g., display) the first to third image information IM1, IM2, and IM3 to a user.

The first display part 110 is exposed to the outside in the first and second operation modes. The second display part 120 is accommodated (e.g., positioned) in the first housing 310 in the first operation mode and exposed from the first housing 310 to the outside in the second operation mode. The third display part 130 is accommodated (e.g., positioned) in the second housing 320 in the first operation mode and exposed from the second housing 320 to the outside in the second operation mode.

In the second operation mode, the first display part 110 may have an area that is about 0.8 times to about 1.2 times the sum of the areas of the second display part 120 and the third display part 130. Here, an area of the flexible display module 100 exposed in the second operation mode is about 2 times that of the flexible display module 100 exposed in the first operation mode. That is, as the first operation mode is changed to the second operation mode, the display apparatus 10 may provide image information that is twice as big to a user.

As illustrated in FIGS. 3A and 3B, the display apparatus 10 may be folded. FIG. 3A illustrates the display apparatus 10 folding in the first operation mode. FIG. 3B illustrates the display apparatus 10 folding in the second operation mode.

The first display part 110 may have a display surface that is divided (e.g., organized or arranged) into a first part 111 and a second part 112 on a plane with respect to the hinge 230. The display apparatus 10 may be in-folded so that the first part 111 and the second part 112 face each other. The portability of the display apparatus 10 may be further increased through such folding. Also, when the display apparatus 10 is capable of in-folding, the display surface may be protected from external impacts or contaminants to increase durability of the display apparatus 10.

Figure 4A:
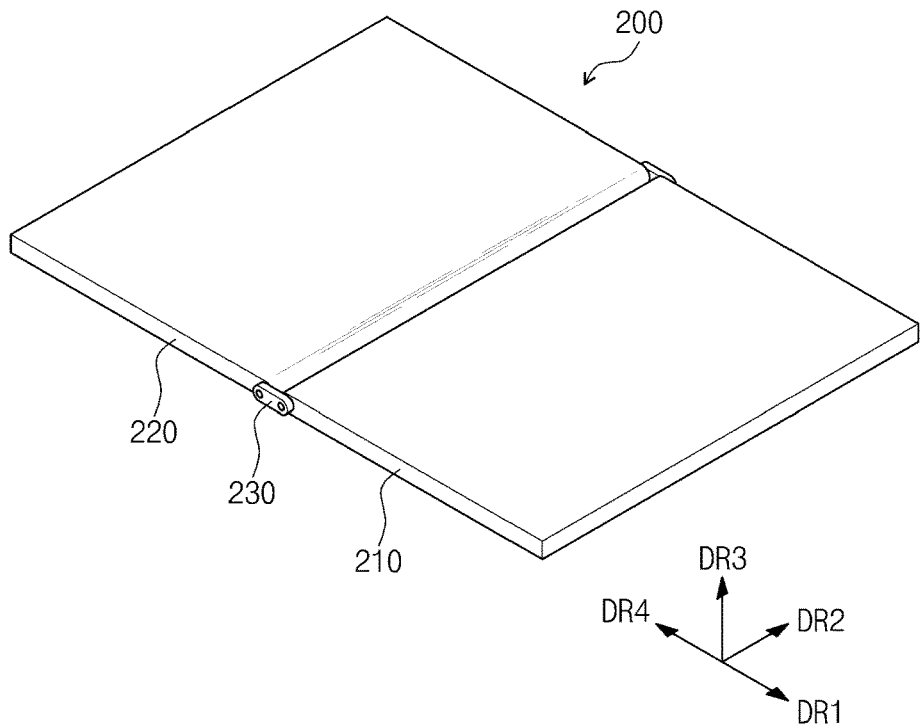
FIGS. 4A and 4B are perspective views of a supporting member according to some example embodiments of the present invention.
Figure 4B:
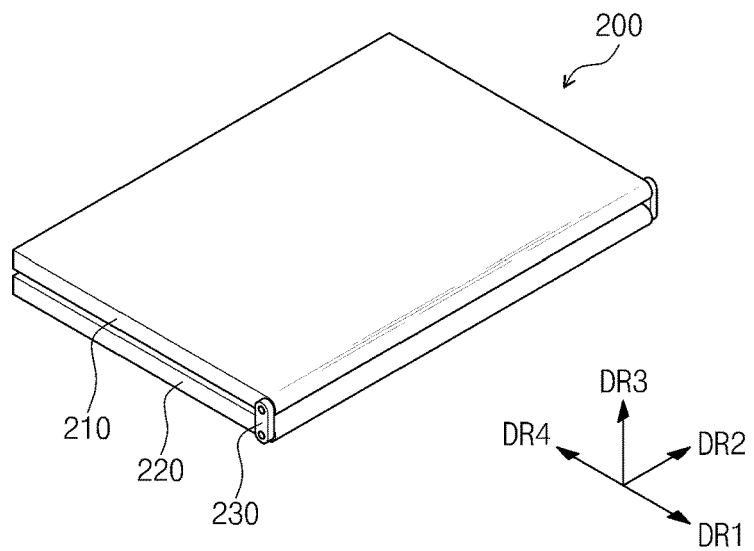

FIGS. 4A and 4B are perspective views of a supporting member of the display apparatus 10, according to some example embodiments of the present invention. FIG. 4A is a perspective view illustrating a shape of a supporting member 200 when the display apparatus (see reference numeral 10 in FIG. 1) is not folded.

FIG. 4B is a perspective view illustrating a shape of the supporting member 200 when the display apparatus (see reference numeral 10 in FIG. 3A) is folded.

The supporting member 200 includes a first supporting part 210, a second supporting part 220, and a hinge 230. The supporting member 200 is coupled to the first display part (see reference numeral 110 in FIG. 3A) of the flexible display module (see reference numeral 100 in FIG. 3A). Thus, when the supporting member 200 is foldable relative to the hinge, the flexible display module (see reference numeral 100 in FIG. 3A) is also foldable relative to the hinge.

The first supporting part 210 for supporting a lower portion of the first part (see reference numeral 111 in FIG. 3A) may have a flat plate shape. The second supporting part 220 for supporting a lower portion of the second part (see reference numeral 112 in FIG. 3A) may have a flat plate shape.

The second supporting part 220 may be spaced a distance (e.g., a predetermined distance) from the first supporting part 210. Also, the contact interface of the first supporting part 210 and the second supporting part 220 may have a curved shape. The curved shape allows the first and second supporting parts 210 and 220 to flexibly move without interfering with each other in a folding process of the supporting member 200. Embodiments of the present invention, however, are not limited to the contact interface of the first supporting part 210 and the second supporting 220 having a curved shape.

The hinge 230 connects the first supporting part 210 to the second supporting part 220. Also, the hinge 230 allows the first and second supporting parts 210 and 220 to each rotate with respect to a direction axis parallel to a second direction DR2.

According to some embodiments, the supporting member 200 is hard enough to support the flexible display module (see reference numeral 100 in FIG. 2).

Figure 4C:
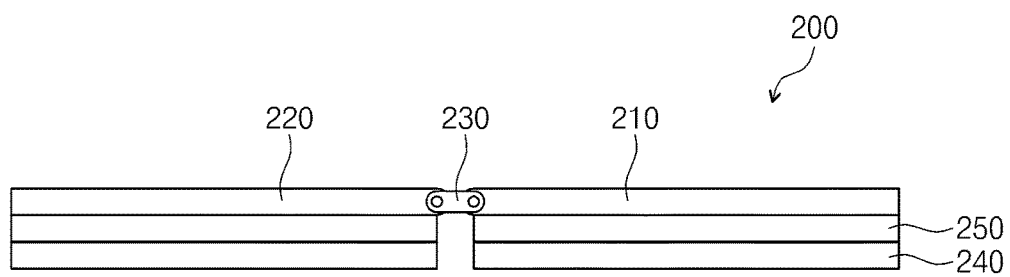
FIG. 4C is a side view of the supporting member according to some example embodiments of the present invention.
Figure 4C:
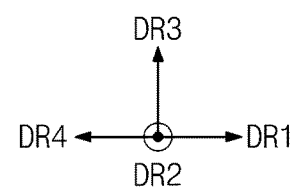

Referring to FIG. 4C, the supporting member 200 may further include a battery 240 and a heat radiation plate 250. When the supporting member 200 includes the battery 240, the thickness and hardness of the supporting member 200 may be increased to support the flexible display module (see reference numeral 100 in FIG. 2) better. The heat radiation plate 250 reduces the heat from the display apparatus (see reference numeral 10 in FIG. 2). The heat radiation plate 250 may include various metals having high thermal conductivity, such as copper and aluminum to rapidly discharge heat.

The shapes of the first and second supporting parts 210 and 220 are not limited thereto and may be shapes capable of supporting a portion or all of the flexible display module 100. The shape of the hinge 230 is not limited thereto and may be a structure arranged between the first and second supporting parts 210 and 220 to allow each of the first and second supporting parts 210 and 220 to rotate.

Figure 5:
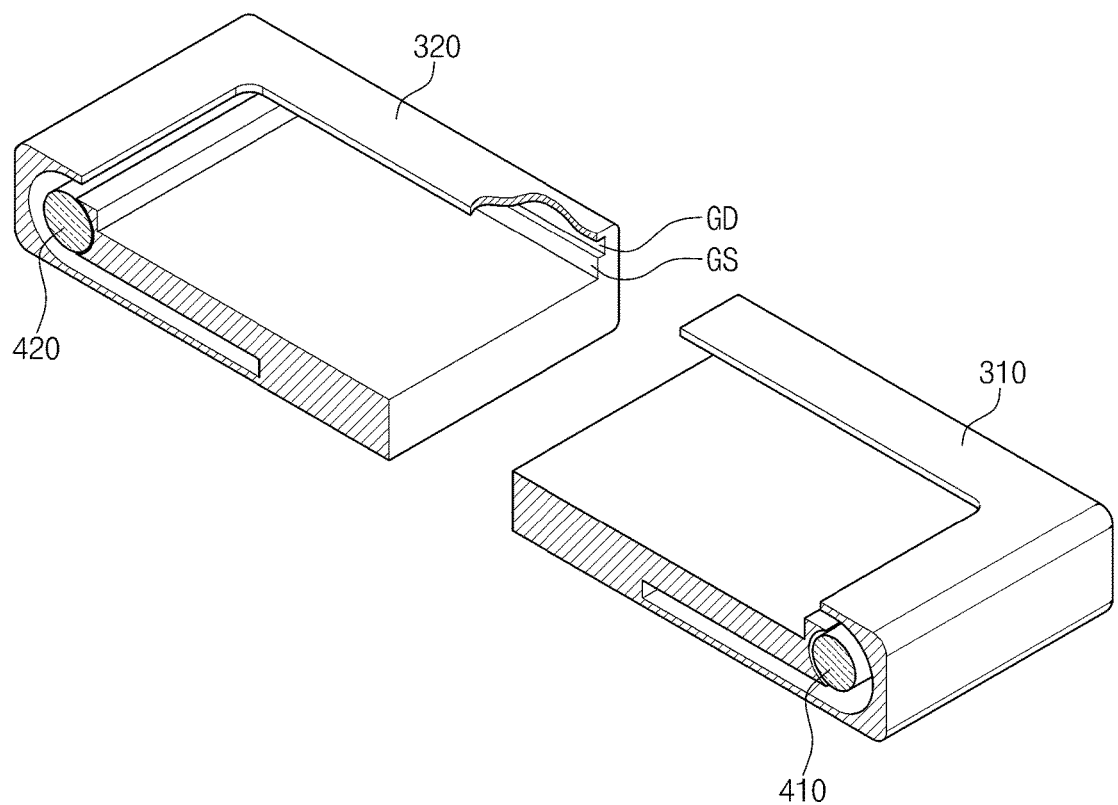
FIG. 5 is a perspective view of a housing and a guide member according to some example embodiments of the present invention.
Figure 6:
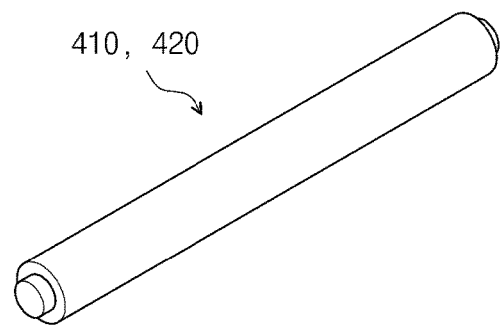
FIG. 6 is a perspective view of a guide member according to some example embodiments of the present invention.

FIG. 5 is a perspective view of a housing and a guide member of the display apparatus 10, according to some example embodiments of the present invention. FIG. 6 is a perspective view of the guide member according to some example embodiments of the present invention.

As illustrated in FIG. 5, a first guide member 410 is coupled to the first housing 310, and a second guide member 420 is coupled to the second housing 320.

Referring to FIG. 5, a space (e.g., a predetermined space) may be defined in each of the first and second housings 310 and 320, and the flexible display module (see reference numeral 100 in FIG. 2) and the supporting member (see reference numeral 200 in FIG. 2) may be accommodated (e.g., positioned) in inner spaces of the first and second housings 310 and 320. The first supporting part 210 may be inserted into or withdrawn from the first housing 310. The second supporting part 220 may be inserted into or withdrawn from the second housing 320.

A display module guide groove GD may be defined in each of the first and second housings 310 and 320. The flexible display module (see reference numeral 100 in FIG. 2) may be arranged in the display module guide groove GD. The display module guide groove GD may maintain the flexible display module (see reference numeral 100 in FIG. 2) in a flat state.

The display module guide groove GD guides a moving position of the flexible display module (see reference numeral 100 in FIG. 2). While the operation mode is changed between the first operation mode and the second operation mode, the second and third display parts 120 and 130 of the flexible display module (see reference numeral 100 in FIG. 2) are guided by the display module guide groove GD in the first and second housings 310 and 320, respectively.

A supporting member guide groove GS may be defined in each of the first and second housings 310 and 320. The supporting member (see reference numeral 200 in FIG. 2) may be arranged in the supporting member guide groove GS.

The supporting member guide groove GS guides a moving position of the supporting member (see reference numeral 200 in FIG. 2). While the operation mode is changed between the first operation mode and the second operation mode, the first and second supporting parts 210 and 220 are guided by the supporting member guide groove GS in the first and second housings 310 and 320.

The first and second housings 310 and 320 protect the flexible display module (see reference numeral 100 in FIG. 2) from external impacts and pollutants.

However, the shapes of the first and second housings 310 and 320 are not limited thereto, and if an inner space for accommodating the flexible display module (see reference numeral 100 in FIG. 2) and the supporting member (see reference numeral 200 in FIG. 2) exists and a portion for guiding the flexible display module (see reference numeral 100 in FIG. 2) and the supporting member (see reference numeral 200 in FIG. 2) is defined, the shapes of the first and second housings 310 and 320 may be different from those illustrated in FIG. 5.

The first guide member 410 is coupled to the first housing 310 to guide the flexible display module (see reference numeral 100 in FIG. 2). The first guide member 410 may contact the second display part (see reference numeral 120 in FIG. 2). A surface at which the first guide member 410 contacts the second display part (see reference numeral 120 in FIG. 2) may have a curved shape. This is because the curved shape may relieve stress applied to the second display part (see reference numeral 120 in FIG. 2) when the operation mode changes between the first operation mode and the second operation mode.

The first guide member 410 may be a rotational body. Here, the first guide member 410 rotates (e.g., about a central axis of the first guide member 410) to allow the second display part (see reference numeral 120 in FIG. 2) to move along the display module guide groove GD.

The second guide member 420 is coupled to the second housing 320 to guide the flexible display module (see reference numeral 100 in FIG. 2). The second guide member 420 may contact the third display part (see reference numeral 130 in FIG. 2). A surface at which the second guide member 420 contacts the third display part (see reference numeral 130 in FIG. 2) may have a curved shape. This is because the curved shape may relieve stress applied to the third display part (see reference numeral 130 in FIG. 2) when the operation mode changes between the first operation mode and the second operation mode.

The second guide member 420 may be a rotational body. Here, the second guide member 420 rotates to allow the third display part (see reference numeral 130 in FIG. 2) to move along the display module guide groove GD.

The shapes of the first and second guide members are not limited thereto and may be any shape that helps to guide the flexible display module (see reference numeral 100 in FIG. 2).

Figure 7B:
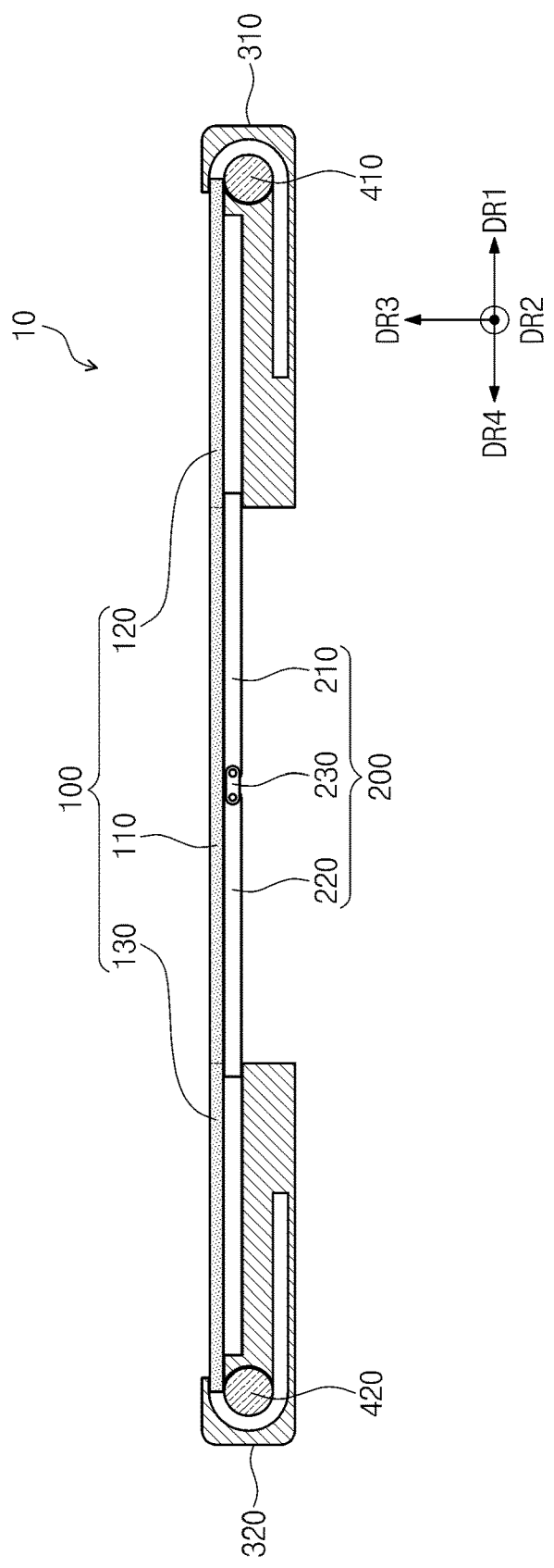
Figure 8:
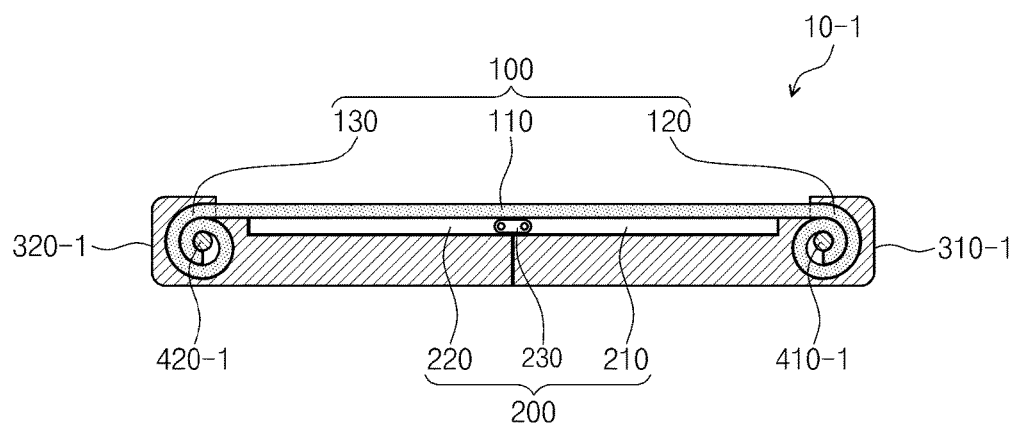
Figure 9:
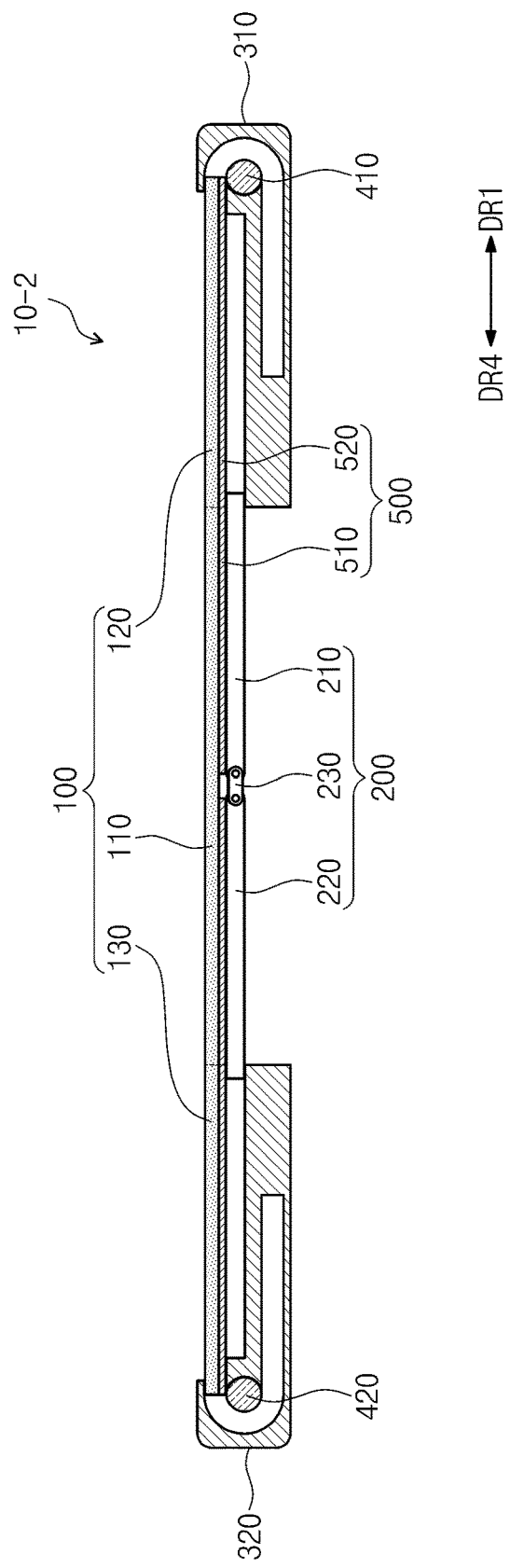

FIGS. 7A to 9 are cross-sectional views of a display apparatus according to some example embodiments of the present invention. FIGS. 7A and 7B illustrate cross-sections of the display apparatus 10 in the first and the second operation modes. FIG. 8 illustrates a cross-section of a display apparatus 10-1 in which a first housing 310-1 and a second housing 320-1 rolls a portion of the flexible display module 100 to accommodate the portion of the flexible display module 100. FIG. 9 illustrates a cross-section of a display apparatus 10-2 that further includes a lower protection member 500 for protecting a lower portion of the flexible display module 100.

Referring to FIGS. 7A and 7B, the first housing 310 and the second housing 320 may be arranged at the outmost portion of the display apparatus 10.

In the first operation mode illustrated in FIG. 7A, the first housing 310 and the second housing 320 are coupled to each other. In the second operation mode illustrated in FIG. 7B, the first housing 310 moves in the first direction DR1, and the second housing 320 moves in the fourth direction DR4 so that the first housing 310 and the second housing 320 are separated from each other.

Referring to FIG. 7A, in the first operation mode, the first supporting part 210 is inserted into the first housing 310, and the second supporting part 220 is inserted into the second housing 320.

Referring to FIGS. 7A and 7B, when the first supporting part 210 is inserted into the first housing 310, the first guide member 410 guides the second display part 120 to be inserted into the first housing 310. When the first supporting part 210 starts to be inserted into the first housing 310, the first guide member 410 transfers one end of the second display part 120 in the first direction DR1 and bends the end at about 180°. Thereafter, one end of the second display part 120, which is bent at about 180°, is horizontally transferred in the fourth direction DR4. Accordingly, the first display part 110 and the second display part 120 face each other in the first operation mode.

When the second supporting part 220 is inserted into the second housing 320, the second guide member 420 guides the third display part 130 to be inserted into the second housing 320. When the second supporting part 220 starts to be inserted into the second housing 320, the second guide member 420 transfers one end of the third display part 130 in the fourth direction DR4 and bends the end at about 180°. Thereafter, one end of the third display part 130, which is bent at about 180°, is horizontally transferred in the first direction DR1. Accordingly, the first display part 110 and the third display part 130 face each other in the first operation mode.

Referring to FIG. 7B, in the second operation mode, the first supporting part 210 is withdrawn from the first housing 310, and the second supporting part 220 is withdrawn from the second housing 320.

When the first supporting part 210 is withdrawn from the first housing 310, the first guide member 410 guides the second display part 120 to be withdrawn from the first housing 310. When the first supporting part 210 is completely withdrawn from the first housing 310, the first display part 110 and the second display part 120 may be on the same plane.

When the first supporting part 210 is completely withdrawn from the first housing 310, the first housing 310 may further include an additional fixing unit to prevent the first supporting part 210 or the second display part 120 from being completely separated from the first housing 310.

When the second supporting part 220 is withdrawn from the second housing 320, the second guide member 420 guides the third display part 130 to be withdrawn from the second housing 320. When the second supporting part 220 is completely withdrawn from the second housing 320, the first display part 110 and the third display part 130 may be on the same plane. When the second supporting part 220 is completely withdrawn from the second housing 320, the second housing 320 may further include an additional fixing unit to prevent the second supporting part 220 or the third display part 130 from being completely separated from the second housing 320.

Referring to FIG. 8, in the first operation mode, a first housing 310-1 and a second housing 320-1 accommodate a portion of the flexible display module 100, which is rolled around a first guide member 410-1 and a second guide member 420-1. In the first operation mode, the second display part 120 is rolled around the first guide member 410-1, and the third display part 130 is rolled around the second guide member 420-1.

The first guide member 410-1 rolls the second display part 120 that is inserted into the first housing 310-1 around the first guide member 410-1. Also, the second guide member 420-1 rolls the third display part 130 that is inserted into the second housing 320-1 around the second guide member 420-1. Here, to easily roll the flexible display module 100, the first guide member 410-1 and the second guide member 420-1 may have a cylindrical shape, although embodiments of the present invention are not limited thereto.

Referring to FIG. 9, a display apparatus 10-2 including a lower protection member 500 is arranged or positioned under the flexible display module 100. The lower protection member 500 is provided to protect a lower portion of the flexible display module 100 against stress caused by external impacts, repeated rolling, or sliding. The lower protection member 500 may be divided into a first lower protection member 510 and a second lower protection member 520.

The first lower protection member 510 may be arranged or positioned under the first display part 110 and may include metal. Thus, the first lower protection member 510 may have a hard property so as not to bend. Because the first display part 110 is not curved or bent in the first and second operation modes, the first display part 110 may be protected by the protection member having a hard property.

The second lower protection member 520 may be arranged or positioned under the second and third display parts 120 and 130 and may include a plastic film. Thus, the second lower protection member 520 may be easily curved or bent by an external force. Because the second display part 120 and the third display part 130 are curved or bent in the first operation mode, the second display part 120 may be protected by the second lower protection member having a soft property.

However, the positioning of the protection member 500 is not limited thereto, and the second lower protection member 520 instead of the first lower protection member 510 may be arranged or positioned under the first display part 110.

Figure 10A:
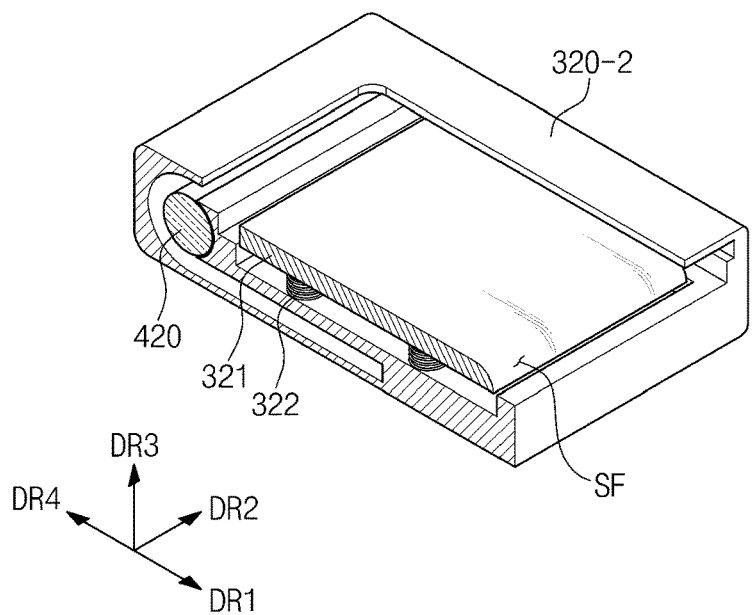
FIGS. 10A to 10C are perspective views of a housing and a guide member according to some example embodiments of the present invention.
Figure 10B:
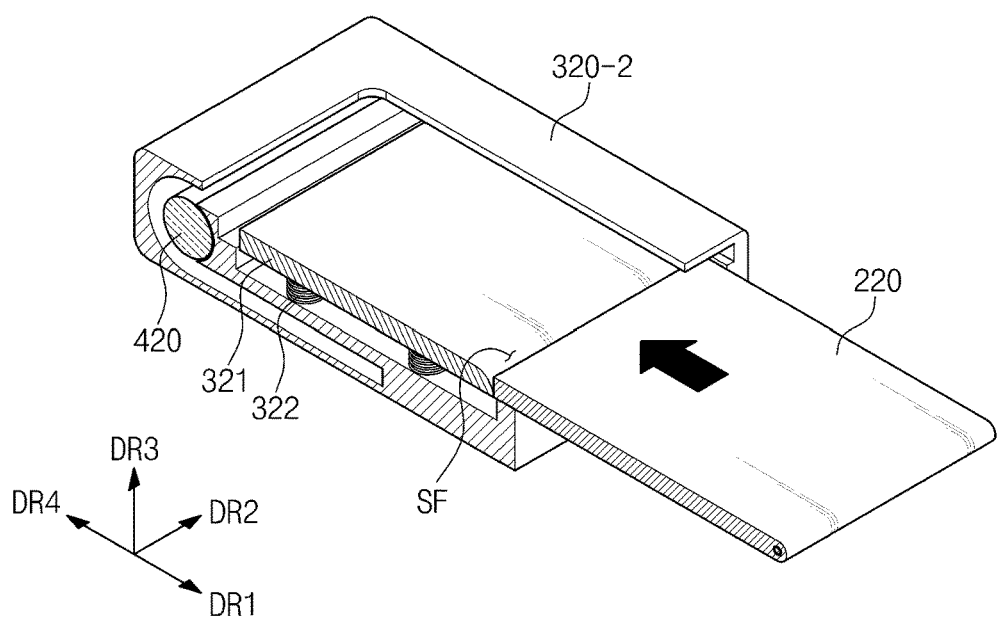
Figure 10C:
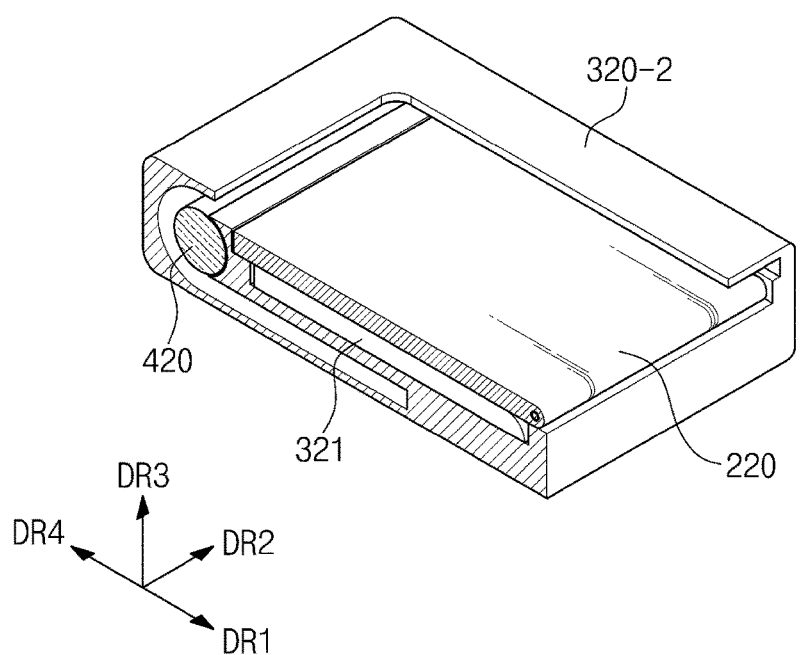

FIGS. 10A to 10C are perspective views of a housing and a guide member according to an embodiment of the inventive concept. FIGS. 10A to 10C illustrate a second housing 320-2 including an auxiliary supporting member 321 and an elastic member 322. A first housing including an auxiliary supporting member and an elastic member is not shown because the first housing is substantially the same as the second housing 320-2.

FIGS. 10A and 10B illustrate the second housing 320-2 in the second operation mode. In the second operation mode, an auxiliary supporting member 321 of the second housing 320-2 is arranged or positioned below the third display part (see reference numeral 130 in FIG. 2) to support the third display part (see reference numeral 130 in FIG. 2).

The elastic member 322 may be arranged or positioned under the auxiliary supporting member 321. In the second operation mode, the elastic member 322 pushes the auxiliary supporting member 321 up in a third direction DR3. Accordingly, the auxiliary supporting member 321 may support the third display part (see reference numeral 130 in FIG. 2).

The auxiliary supporting member 321 may have one end that is a curved surface SF having a predetermined curvature. When the second supporting part 220 moves in the fourth direction DR4 in a state in which the curved surface SF of the auxiliary supporting member 321 contacts the second supporting part 220, a force may be applied between the curved surface SF and the second supporting part 220. The auxiliary supporting member 321 may be moved toward a lower side of the second supporting part 220 by a force acting between the curved surface SF and the second supporting part 220.

FIG. 10C illustrates the second housing 320-2 in the first operation mode. In the first operation mode, the auxiliary supporting member 321 is arranged below the second supporting part 220.

Referring to FIG. 7B, a separating space may be generated between the flexible display module 100 and the housings 310 and 320 in the second operation mode, and as illustrated in FIGS. 10A to 10C, the separating space may be compensated for when the auxiliary supporting member 321 and the elastic member 322 are used.

Figure 11:
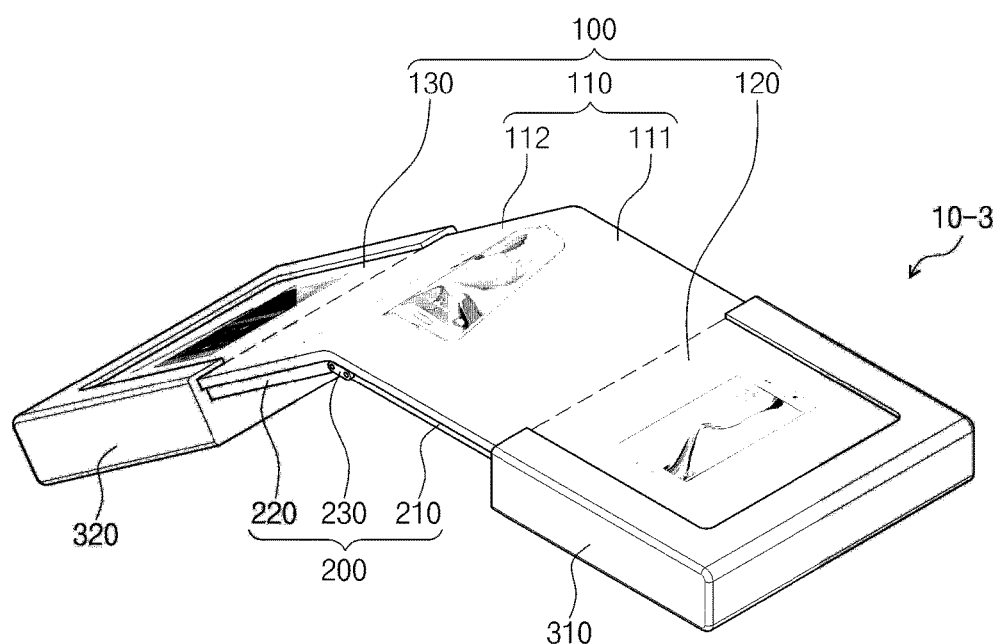
FIG. 11 is a perspective view of a display apparatus according to some example embodiments of the present invention t.

FIG. 11 is a perspective view of the display apparatus according to some example embodiments of the present invention. FIG. 11 illustrates a display apparatus 10-3 that is folded in a direction opposite to the display apparatus illustrated in FIGS. 3A and 3B.

The first display part 110 may have a display surface that is divided into a first part 111 and a second part 112 on a plane with respect to the hinge 230. The display apparatus 10 may be out-folded so that the first part 111 and the second part 112 face the outside. The portability of the display apparatus 10-3 may be further improved through such folding. Also, when the display apparatus 10 is capable of out-folding, various other forms of image information may be provided to a user.

Figure 12A:
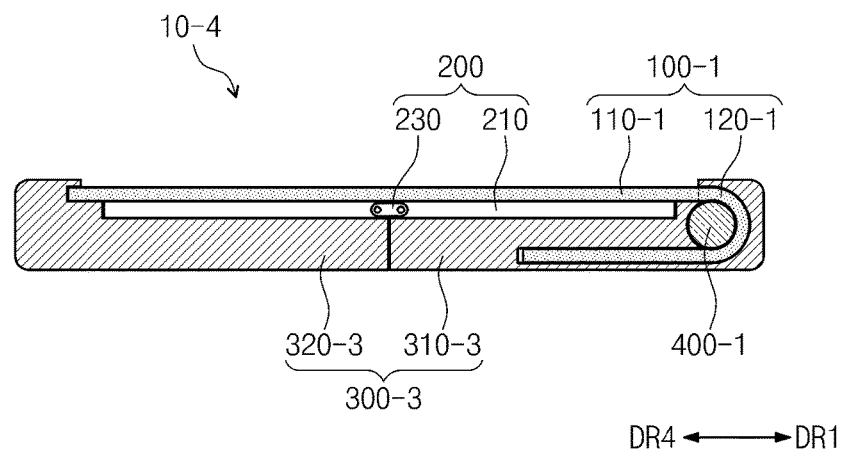
FIGS. 12A to 13 are cross-sectional views of a display apparatus according to some example embodiments of the present invention.
Figure 12B:
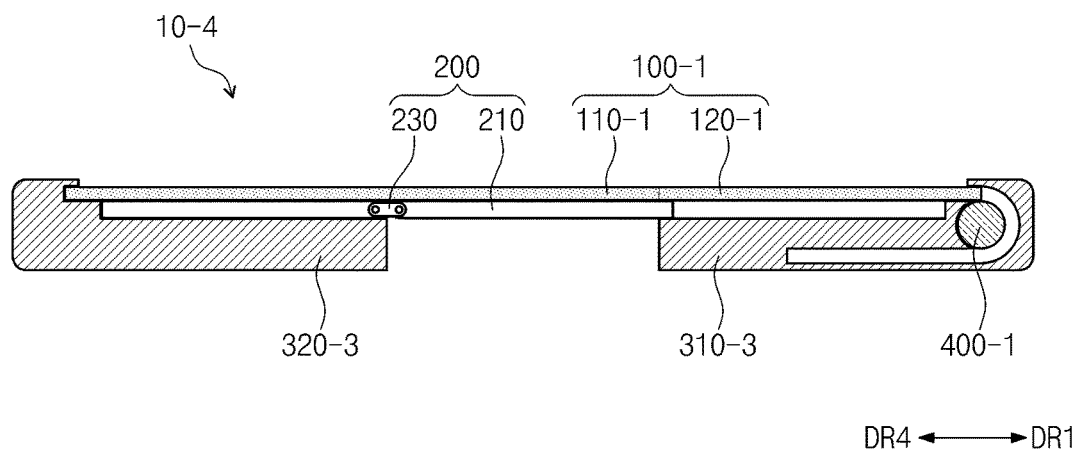
Figure 13:
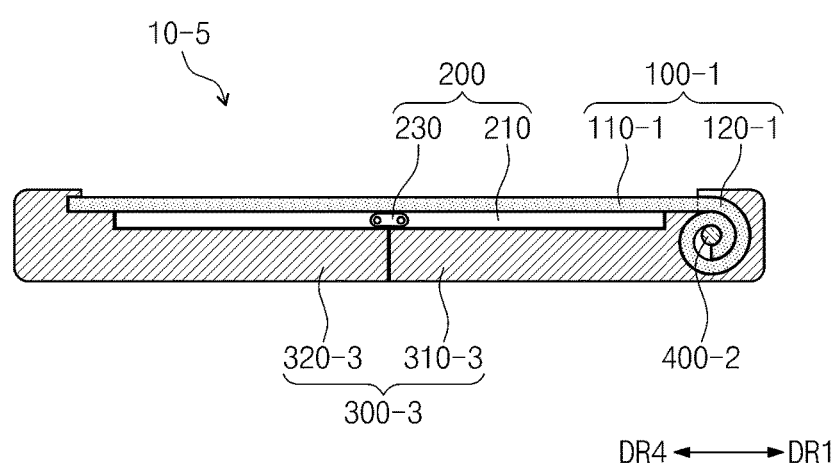

FIGS. 12A to 13 are cross-sectional views of a display apparatus according to an embodiment of the inventive concept.

A display apparatus 10-4 illustrated in FIGS. 12A and 12B may slide to only one side unlike the display apparatuses 10, 10-1, 10-2, and 10-3 described above. FIG. 12A illustrates a display apparatus 10-4 in a closed mode (hereinafter, referred to as a "first operation mode"). FIG. 12B illustrates the display apparatus 10-4 in an opened mode (hereinafter, referred to as a "second operation mode")

The display apparatus 10-4 includes a flexible display module 100-1, a supporting member 200, housings 300-3, and a guide member 400-1. The flexible display module 100-1 includes a first display part 110-1 and a second display part 120-1. The supporting member 200 includes a supporting part 210 and a hinge 230. The housings 300-3 are divided into a first housing 310-3 and a second housing 320-3. The guide member 400-1 is coupled to the first housing 310-3.

The flexible display module 100-1 has one side portion connected to the first housing 310-3. In detail, the one side portion of the second display part 120-1 may be connected to the first housing 310-3. The supporting member 200 is coupled to the first display part 110-1. The supporting part 210 may be inserted into or withdrawn from the first housing 310-3. When the supporting part 210 is inserted into or withdrawn from the first housing 310-3, the guide member 400-1 guides the second display part 120-1.

Referring to FIG. 12A, the first housing 310-3 and the second housing 320-3 are coupled to each other in the first operation mode. In the first operation mode, the first display part 110-1 may be exposed to the outside and provide image information to a user. In the first operation mode, the second display part 120-1 is accommodated in the first housing 310-3.

Referring to FIG. 12B, the first housing 310-3 and the second housing 320-3 are separated from each other in the second operation mode. In the second operation mode, the first housing 310-3 may move in the first direction DR1. In the second operation mode, the second display part 120-1 is exposed to the outside from the first housing 310-3. In the second operation mode, the first and second display parts 110-1 and 120-1 may be exposed to the outside and each provide image information to a user.

That is, the first display part 110 is exposed to the outside in the first and second operation modes. The second display part 120-1 is accommodated in the first housing 310-3 in the first operation mode and exposed to the outside from the first housing 310-3 in the second operation mode.

In the second operation mode, the first display part 110-1 may have an area that is about 0.4 times to about 0.6 times the area of the second display part 120-1. Here, the area of the flexible display module 100 exposed in the second operation mode may be about 1.5 times the area of the flexible display module 100-1 exposed in the first operation mode. That is, as the operation mode changes from the first operation mode to the second operation mode, the display apparatus 10-4 may provide image information about 1.5 times bigger to a user.

The flexible display module 100-1 may be foldable relative to the hinge 230. The flexible display module 100-1 may be in-folded so that display surfaces of the flexible display module 100-1 face each other. Also, the display surfaces of the flexible display module 100-1 may be out-folded to face the outside.

The first guide member 400-1 may be bent so that the second display part 120-1 that is inserted into the first housing 310-1 faces the first display part 110-1.

The first housing 310-1 may include an auxiliary supporting member. As a description of the auxiliary supporting member would be substantially the same as the description with reference to FIGS. 10A to 10C, the description will not be provided again.

Referring to FIG. 13, in the first operation mode, a first housing 310-3 accommodates a flexible display module 100-1 that is rolled around a guide member 400-2. In the first operation mode, a second display part 120-1 is rolled around the guide member 400-2. That is, the guide member 400-2 rolls the second display part 120-1 that is inserted into the first housing 310-3 around the guide member 400-2. Here, to easily roll the flexible display module 100-1, the guide member 400-2 may have a cylindrical shape.

According to an embodiment of the inventive concept, a display apparatus including a flexible display module and capable of folding and sliding may be provided. According to another embodiment of the inventive concept, a display apparatus including a flexible display module and capable of folding and rolling may be provided. Thus, the portability and the durability of display apparatuses may be improved.

Although embodiments of the inventive concept have been described with reference to the accompanying drawings, those with ordinary skill in the technical field to which the inventive concept pertains will understand that the present disclosure can be implemented in other specific forms without changing the technical ideas or essential features thereof. Therefore, it should be understood that the embodiments described above are examples in all aspects and are not restrictive. Rather, it will be understood by those of ordinary skill in the art that various changes in the form and details may be made without departing from the spirit and scope of the present invention as defined be the following claims, and their equivalents.

What is claimed is:

1. A display apparatus, comprising:
a flexible display module comprising a first display part, a second display part, and a third display part;
a supporting member coupled to the first display part and comprising a hinge, a first supporting part, and a second supporting part;
a first housing configured to have the first supporting part inserted and withdrawn;
a second housing configured to have the second supporting part inserted and withdrawn;
a first guide member coupled to the first housing and configured to guide the second display part to move behind the first supporting part, along a first guide groove in the first housing, toward the second housing when the first supporting part is inserted into the first housing;
a second guide member coupled to the second housing and configured to guide the third display part to move behind the second supporting part, along a second guide groove in the second housing, toward the first housing when the second supporting part is inserted into the second housing; and
a rigid auxiliary supporting member contacting an underside of the second display part when the first supporting part is withdrawn from the first housing, or contacting an underside of the third display part when the second supporting part is withdrawn from the second housing,
wherein the flexible display module is foldable about the hinge,
wherein a display surface of the first display part is divided into a first part and a second part on a plane with respect to the hinge, and
the first part and the second part are configured to be in-folded to face each other or out-folded to face the outside.

2. The display apparatus of claim 1, wherein the first housing and the second housing are configured to be coupled to each other in a first operation mode, and the first housing and the second housing are configured to be separated from each other in a second operation mode.

3. The display apparatus of claim 2, wherein the first display part is configured to be exposed to the outside in the first operation mode and the second operation mode,
the second display part is configured to be accommodated in the first housing in the first operation mode and is configured to be exposed to the outside from the first housing in the second operation mode, and
the third display part is configured to be accommodated in the second housing in the first operation mode and is configured to be exposed to the outside from the second housing in the second operation mode.

4. The display apparatus of claim 3, wherein the first guide member is configured to bend the second display part that is inserted into the first housing to face the first display part, and
the second guide member is configured to bend the third display part that is inserted into the second housing to face the first display part.

5. The display apparatus of claim 3, wherein the first guide member is configured to roll the second display part inserted into the first housing to be wound around the first guide member, and
the second guide member is configured to roll the third display part inserted into the second housing to be wound around the second guide member.

6. The display apparatus of claim 3, wherein the each of the first housing and the second housing comprise an auxiliary supporting member is below the supporting member in the first operation mode and below the second display part or the third display part in the second operation mode.

7. The display apparatus of claim 1, wherein at least one of the first guide member and the second guide member is a rotational body.

8. The display apparatus of claim 1, further comprising:
a first lower protection member below the first display part and comprising metal; and
a second lower protection member below the second display part and the third display part and comprising a plastic film.

9. The display apparatus of claim 1, wherein the supporting member further comprises a heat radiation plate and a battery.

10. The display apparatus of claim 1, wherein the first display part has an area in a range of 0.8 times to 1.2 times the sum of areas of the second and third display parts.

11. A display apparatus, comprising:
a flexible display module comprising a first display part and a second display part;
a supporting member coupled to the first display part and comprising a hinge and a supporting part;

a first housing coupled to a first side portion of the flexible display module and configured to have the supporting part inserted and withdrawn;

a second housing coupled to a second side portion of the flexible display module; and a guide member coupled to the first housing and guiding the second display part to move behind the supporting part, along a guide groove in the first housing, toward the first housing when the supporting part is inserted into the first housing; and a rigid auxiliary supporting member contacting an underside of the second display part when the supporting part is withdrawn from the first housing, wherein the flexible display module is foldable about the hinge, wherein a display surface of the first display part is divided into a first part and a second part on a plane with respect to the hinge, and the first part and the second part are configured to be in-folded to face each other or out-folded to face the outside.

12. The display apparatus of claim 11, wherein the first housing and the second housing are configured to be coupled to each other in a first operation mode, and the first housing and the second housing are configured to be separated from each other in a second operation mode.

13. The display apparatus of claim 12, wherein the first display part is configured to be exposed to the outside in the first operation mode and the second operation mode, and the second display part is configured to be accommodated in the first housing in the first operation mode and is configured to be exposed to the outside from the first housing in the second operation mode.

14. The display apparatus of claim 13, wherein the guide member is configured to bend the second display part that is inserted into the first housing to face the first display part.

15. The display apparatus of claim 13, wherein the guide member is configured to roll the second display part that is inserted into the first housing to be wound around the first guide member.

16. The display apparatus of claim 13, wherein the first housing comprises an auxiliary supporting member is below the supporting member in the first operation mode and below the second display part in the second operation mode.

* * * * *